United States Patent [19]
Wallshein

[11] 3,835,539
[45] Sept. 17, 1974

[54] ORTHODONTIC APPLIANCE

[76] Inventor: Melvin Wallshein, 8645 Bay Pky., Brooklyn, N.Y. 11230

[22] Filed: Nov. 8, 1972

[21] Appl. No.: 304,741

[52] U.S. Cl. .............................................. 32/14 A
[51] Int. Cl. ............................................. A61c 7/00
[58] Field of Search ................................. 32/14 A

[56] References Cited
UNITED STATES PATENTS

| | | | |
|---|---|---|---|
| 1,821,171 | 9/1931 | Atkinson | 32/14 A |
| 3,076,265 | 2/1963 | Moore | 32/14 A |
| 3,237,305 | 3/1966 | Hegedus | 32/14 A |
| 3,256,602 | 6/1966 | Broussard et al. | 32/14 A |
| 3,374,542 | 3/1968 | Moylan, Jr. | 32/14 A |
| 3,408,739 | 11/1968 | Johnson | 32/14 A |
| 3,606,685 | 9/1971 | Schwartz | 32/14 A |
| 3,633,277 | 1/1972 | Reichel | 32/14 A |
| 3,641,672 | 2/1972 | Kesling | 32/14 A |

Primary Examiner—Robert Peshock
Assistant Examiner—J. Q. Lever
Attorney, Agent, or Firm—Friedman & Goodman

[57] ABSTRACT

A spring clip for use in association with both an arch wire and an orthodontic bracket includes a pin which is insertable through an upright retaining channel of the bracket. The length of the pin is longer than the channel and the pin is releasably secured to the bracket by a flexible free end portion which is deformable subsequent to insertion of the pin into the retaining channel. When used with an edgewise bracket having a wire containing channel in its front face, a spring clip retaining finger may be connected to an exposed free end portion of the pin which is biased to abut against the front surface of the bracket to thereby retain the arch wire within the wire retaining channel of the bracket. Alternately, or additionally, a biassing finger may be provided which is integral with the pin at an exposed free end portion thereof and which is arranged in pressure transmitting relationship with the wire when the biassing finger is flexed from a normally unstressed position on the opposite side to a stressed position on the same side of the wire as the pin.

15 Claims, 10 Drawing Figures

PATENTED SEP 17 1974 3,835,539
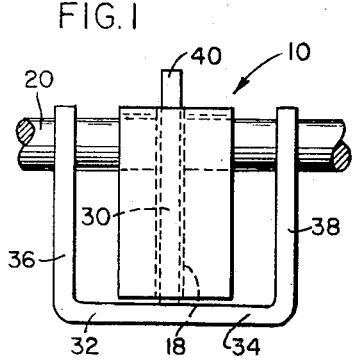
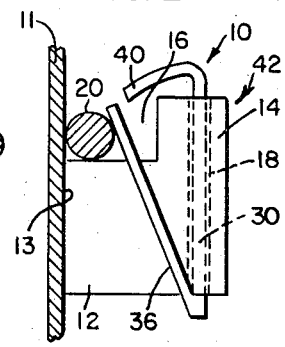
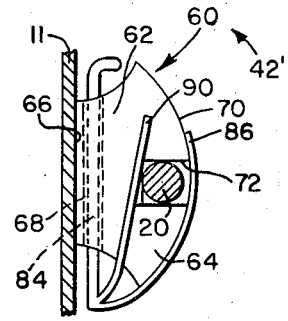
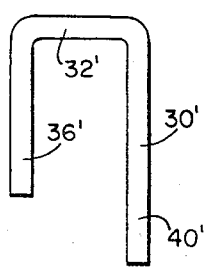
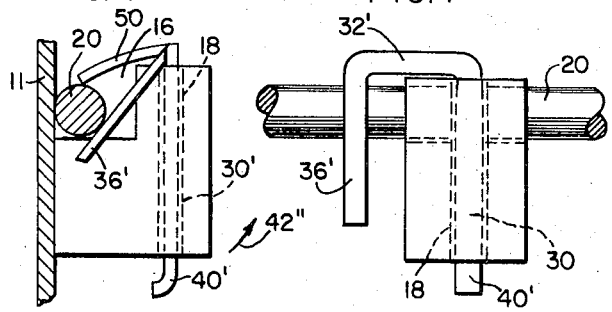
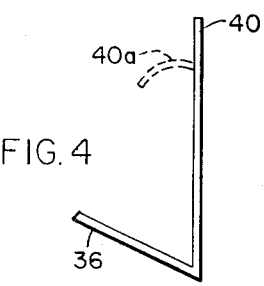
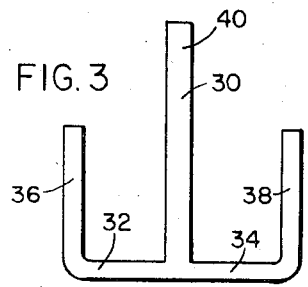
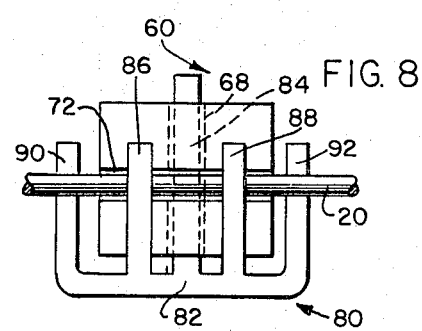
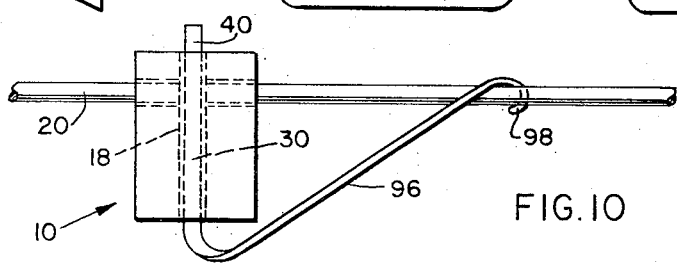

ORTHODONTIC APPLIANCE

BACKGROUND OF THE INVENTION

The present invention relates generally to the orthodontic field and more particularly to a spring clip which is to be used in association with an orthodontic bracket and arch wire.

Generally speaking, orthodontic procedures involve the securing of an orthodontic bracket to a maloccluded tooth, a bracket having a channel for receiving an arch wire. In order to properly confine the arch wire within the channel of the bracket, a tie wire is utilized which is non-resilient in nature.

The tie wire of this variety defines what may be characterized as a loop which is wrapped around the flanged ears or wings of the bracket, so that the two parallel segments of the loop underlie the flanged wings respectively of the bracket while the other two parallel segments of the loop transversely overlie the arch wire so as to confine the latter within the channel of the bracket.

A disadvantage associated with this prior art type of loop is that the tie wire must be wrapped around the bracket wings and then the ends of the tie wire must be twisted for securement thereof, after which the twisted ends must be tucked away so as not to cause any damage in the patient's mouth. Additionally, the tie wire must be cut in order to change the same, and a new tie wire must be used for replacement thereof.

A still further disadvantage of the prior art tie wire is that segments thereof, which transversely overlie the arch wire, are biased directly against the arch wire itself to cause friction which effects a binding therebetween, thereby limiting the movement of the bracket and the tooth associated therewith along the arch wire so that the arch wire is not effective to properly align the maloccluded tooth.

In addition to the above-mentioned disadvantages in the use of tie wires, these wires have the still further disadvantage that they serve the single function of preventing the arch wire from leaving the channel of the bracket. Accordingly, up to now, when movement of a tooth was required, e.g. tipping, root movement, or the like, it has been necessary to attach additional devices to the arch wire which applied forces to the tooth relative to the almost fixed arch wire. In addition to being inconvenient, the necessity of utilizing additional orthodontic devices for this purpose is time-consuming. Since the additional orthodontic biassing device is manually connected to the arch wire, the extent to which the device is securely connected to the arch wire depends on the individual who forms the connection. Also, since the relative positions of the biassing device are not predictably and repeatably fixed relative to the brackets along the arch wire, the forces which are applied to the teeth are not easily predictable and vary from case to case depending on how and where the devices are attached. The last mentioned disadvantages regarding additional biassing devices required in the prior art apply equally with respect to the so-called Begg-type orthodontic bracket.

SUMMARY OF THE INVENTION

Accordingly, in order to achieve the above objects, as well as others which will become obvious hereafter, it is an object of the present invention to provide an orthodontic appliance which does not have the disadvantages which exist in connection with such known appliances.

It is another object of the present invention to provide an orthodontic appliance as described above which is simple in construction and economical to manufacture.

It is still another object of the present invention to provide an orthodontic appliance in the form of a new and improved pin-supported orthodontic appliance for use with an arch wire and a bracket in which the arch wire is to be confined.

It is yet another object of the present invention to provide an orthodontic appliance of the type under discussion in the form of a pin-supported appliance for an orthodontic arch wire and bracket which can be effectively secured and easily removed from the bracket upon which the appliance is to be mounted.

It is a further object of the present invention to provide a novel orthodontic appliance for use with an orthodontic bracket which, while mounted on the bracket, effectively confines an orthodontic arc wire within the bracket channel, yet will not cause undesirable friction between itself and the arch wire to effect a binding therebetween which would limit the movement of the bracket and tooth associated therewith along the arch wire.

It is yet a further object of the present invention to provide an orthodontic appliance which is simply mountable on an orthodontic bracket and which cooperates with an arch wire to selectively apply forces to the bracket in relation to the arch wire.

It is an additional object of the present invention to provide an orthodontic appliance which cooperates with an edgewise bracket and which serves both to retain the arch wire in the channel of the bracket as well as to selectively apply forces to the bracket relative to the arch wire. In this manner, tooth movements, including tipping, uprighting, rotating, etc., can be simply effected without the use of arch wire loops.

To achieve the above objects, as well as others which will become obvious hereafter, a novel orthodontic appliance is introduced which cooperates with an orthodontic arch wire which is arranged in a channel of an orthodontic bracket. The orthodontic appliance comprises mounting means having at least one resilient portion for securely mounting the appliance on the bracket. Elongated finger means is provided having at least one resilient portion, said finger means being in cantilevered relation thereto. Said finger means is at least resiliently movable and arranged to apply forces to the arch wire relative to the bracket.

According to the presently preferred embodiment, wherein the bracket is provided with an elongated retaining channel generally oriented in a direction normal to the direction of the arch wire and having a predetermined length, said mounting means comprises an elongated pin configurated to pass through the retaining channel and having a length greater than said predetermined length. Securing means are provided for securing said elongated pin in said retaining channel subsequent to passage through the latter.

When utilized with an edgewise bracket having a front face and having the wire containing channel in its front face, said pin has at least one exposed free end portion when contained in said retaining channel. Also, said finger means comprises a retaining finger extending forwardly from said one free end portion at least partially across the front face of the bracket so as to be interposed opposite the wire containing channel. In this manner, said resilient finger prevents the arch wire from leaving the wire containing channel. According to one advantageous variation, two retaining fingers are provided each having a resilient portion integral and in cantilevered relation with said one free end portion of said pin, so that the two retaining fingers are substantially parallel to one another and arranged to abut against the front face of the edgewise bracket.

The orthodontic appliance may alternately, or additionally, be provided with lateral biassing fingers which are configured and positioned to abut against at least one of the two free end portions of the arch wire positioned exteriorly of the bracket beyond each end of the wire containing channel. The biassing fingers are arranged to resiliently abut against one of the exterior portions, whereby a force is applied to the arch wire by said biassing finger relative to the bracket. Either one or two biassing fingers may be provided so as to selectively apply desired forces to the tooth or end bracket relative to the arch wire. Said biassing finger and said pin are angularly positioned relative to each other and define an angle therebetween. Said angle is normally greater in an unstressed state of said biassing finger than when said biassing finger abuts against the arch wire in pressure-transmitting relationship.

Advantageously, said finger means and said pin are constructed from a one-piece flat metal stamping.

According to a further feature of the present invention, said finger means may comprise an elongated lateral biassing finger extending from said mounting means in a direction substantially parallel to the direction of the arch wire. According to this feature, said lateral biassing finger has a curved hook at a free end portion configured to engage the wire after the appliance is mounted on the bracket.

Said securing means may advantageously comprise a flexible free end portion of said pin which is deformable subsequent to passage through said retaining channel.

When utilized in conjunction with a Begg-type bracket having an upper open wire containing channel, said applicance is advantageously provided with holding means for retaining the wire in said open wire containing channel. Said holding means can, for example, comprise a free end portion of said pin which is deformed so as to at least partially close the open channel, or may consist of an elongated projection extending substantially transversely of said pin and arranged on the latter so as to at least partially close the open channel when said pin is mounted on said bracket. In either case, said wire is prevented from moving out of the open channel.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which:

FIG. 1 is a front elevational view of an orthodontic appliance in accordance with the present invention, shown in conjunction with a Begg-type orthodontic bracket and arch wire — the orthodontic appliance being provided with two biassing fingers;

FIG. 2 is a side elevational view of the brackets and orthodontic appliance shown in FIG. 1;

FIG. 3 is a front elevational view of the orthodontic appliance in accordance with the present invention shown in FIG. 1, but without the bracket;

FIG. 4 is a side elevational view of the orthodontic appliance shown in FIG. 3;

FIG. 5 is a second embodiment of the orthodontic appliance in accordance with the present invention, showing only one biassing finger;

FIG. 6 is a side elevational view of the orthodontic bracket shown in FIG. 5 mounted on a Begg-type bracket;

FIG. 7 is a front elevational view of the orthodontic appliance and bracket as shown in FIG. 6;

FIG. 8 is a front elevational view of a third embodiment of the orthodontic appliance in accordance with the present invention, shown utilized in conjunction with an edgewise-type bracket and having two biassing and two retaining fingers;

FIG. 9 is a side elevational view of the orthodontic appliance and bracket as shown in FIG. 8; and FIG. 10 is a front elevational view which illustrates a fourth embodiment of the present invention, the orthodontic appliance here being utilized with a Begg-type bracket and having an elongated lateral biassing finger.

DETAILED DESCRIPTION OF THE PREFERRED EMBODIMENTS

Referring first to FIGS. 1 and 2, an orthodontic bracket is generally illustrated by the reference numeral 10. The bracket illustrated in these first two FIGURES is commonly known as a Begg-type bracket which is directly mounted on a band 11 or directly on a tooth (not shown). The bracket 10 has a short inner-portion 12 which is provided with an abutting surface 13 commonly cemented to the band 11 or a tooth. A more complete description of the orthodontic procedures involved is provided in my simultaneously filed application Ser. No. 304,371, filed Nov. 8, 1972. The bracket 10 is also provided with a long outer portion 14 which, together with the short inner portion 12 forms an open wire containing channel 16.

A retaining channel 18 extends through the long length of the outer portion 14. An arch wire 20 of any conventional type, is placed, during the formation of the arch, in the wire containing channel 16.

Referring to FIGS. 1–4, the first presently preferred embodiment of the present invention includes an elongated pin 30 which is dimensioned so as to be capable of passing through the retaining channel 18 and has a length which is greater than the length of the retaining channel 18, for purposes to be described hereafter. Connected to one end portion are two transverse arms 32, 34. Each of the arms 32, 34 supports a respective finger 36, 38 respectively whose function will be described more fully hereafter. The fingers 36, 38 are spaced from each other a distance greater than the width of the bracket 10.

Pin 30 has a flexible free end portion 40, best seen in FIG. 4, which is normally in an upright position prior to insertion of the pin 30 into a retaining channel 18. The free end portion 40 comprises holding means which, when deformed to a position designated by the reference 40a, at least partially covers the wire containing channel 16. The length of the flexible free end portion 40 is made sufficiently long so that it sufficiently covers the wire containing channel 16 to prevent the arch wire 20 from moving out therefrom.

The fingers 36, 38 comprise biassing fingers which, as can best be seen in FIG. 4, define an angle with respect to the pin 30 in the unstressed state of the appliance. When mounting the appliance, the biassing fingers 36 and 38 are moved in the direction of the pin 30 so as to decrease the angle therebetween and the pin 30 is inserted through the channel 18 to a position shown in FIG. 2. At this time, the biassing fingers 36, 38 are released and, in trying to return to their unstressed position shown in FIG. 4, abut against the arch wire 20 as shown in FIG. 2. The free end portion 40 is now deformed and the orthodontic appliance is mounted on the bracket 10.

As suggested above, the stressed position of the biassing fingers 36, 38 shown in FIG. 2 causes forces to be generated which tend to separate the biassing fingers 36, 38 and the pin 30, i.e., to increase the angle between these elongated members. As well known to those skilled in the art, an arch wire represents a relatively fixed reference point. Accordingly, since the biassing fingers 36, 38 cannot themselves move the arch wire 20, these biassing fingers remain substantially in the position as shown in FIG. 2. However, due to the forces generated in the system, the pin 30 will tend to move in a direction so as to increase the angle between itself and the biassing fingers until the angle therebetween has returned to that as shown in FIG. 4 wherein the stresses in the system are eliminated. Accordingly, the pin 30 will attempt to move away from the band 11 about the lower arms 32, 34 or lower portions of the orthodontic appliance 10 in a direction generally designated by the arrow 42. Since the bracket is rigidly connected to a band or a tooth, such tendancy of the pin 32 to move as indicated simultaneously tends to move the roots of a tooth about a pivot axis generally defined by the arch wire 20 while the crown of the tooth is held substantially fixed. Such movement of a tooth is commonly called torqueing.

In FIGS. 5-7, a second embodiment of the present invention is illustrated which includes a pin 30', similar to the pin 30 described above, and a single arm 32' to which is connected a single biassing finger 36'. The second embodiment is insertable into the channel 18 of the bracket 10 through the top end portion of the bracket instead of the bottom end portion in connection with FIGS. 1 and 2. It should be pointed out, however, that the number of biassing fingers utilized is not determined by which direction the orthodontic appliance is insertable through the bracket. Thus, an orthodontic appliance as illustrated in FIGS. 1 and 2 which is insertable from the bottom end portion of the bracket 10 may be provided with one or two biassing fingers. Similarly, an orthodontic appliance which is insertable through the top end portion of a bracket, as to be described presently, may likewise be provided with either one or two biassing fingers.

The appliance according to FIG. 5 is mountable on the bracket 10 in a similar manner as that described in connection with FIGS. 1 and 2. Thus, the biassing finger 36' is pressed towards the pin 30' so that the biassing finger 36' can be brought to the same side of the arch wire 20 as the pin 30'. After the pin 30' has been fully inserted into the bracket 10, the biassing finger 36' is released and, as before, abuts against the arch wire 20. Because the free end portion 40' of the appliance is now on the lower portion of the bracket, it cannot be utilized, as shown in FIG. 2, to close the wire containing channel 16 to thereby prevent the arch wire 20 from leaving the latter. To overcome this problem in connection with the present embodiment, an elongated projection 50 may be provided which extends from the pin 30' substantially transversely to the latter a distance sufficient to at least partially cover the wire containing channel 16 to thereby prevent the arch wire 20 from moving out from the latter. To retain the orthodontic appliance in the bracket in accordance with the second embodiment, the lower free end portion 40' is advantageously made flexible and is deformed once past through the channel 18.

The application of a single force on one side of the bracket has two effects. Firstly, there is a tendency of the bracket to rotate about its longitudinal of long axis. Secondly, there is the torqueing effect described in connection with FIG. 2 — now in the opposite direction and designated by the arrow 42'. However, because of the nature of the tissues which maintain the position of the teeth in the mouth, the rotating effect occurs at a much faster rate than does the torqueing effect. Consequently, the orthodontic appliance shown in FIGS. 6 and 7 may be utilized to rotate a tooth subsequent to which it may be removed to thereby minimize the amount of torqueing which takes place. Looking at a tooth from the top, a tooth will rotate counterclockwise when an orthodontic appliance such as shown in FIG. 7 is mounted thereon. It is clear, although not shown, that a single biassing finger may equally be placed on the other side in which case the torqueing and rotating effects are similar except that the rotation, looking at a tooth from the top, will be clockwise. It should be noted that in each case the positions of the biassing fingers must be sufficiently to the sides of the pin 30 so that they can abut externally on excessible end portions of the arch wires on the sides of the bracket and not abut against the front surface. The further the biassing fingers are positioned from the center of the bracket, the greater is the moment arm and the greater is the torque which will cause rotation.

To prevent rotation of the appliance about the channel 18 or the pin 30, the latter may have a cross-section selected to lock the pin in the channel 18 about the long axis of the pin. Alternately, an engaging member (not shown) may extend from the arm 32 which engages the bracket so as to prevent rotation of the arm 32' about the channel 18. A pin 30, as described above, provided with resilient fingers may equally be utilized with an edgewise bracket, as shown in FIGS. 8 and 9. Here, an edgewise bracket is generally designated by the reference numeral 60. The edgewise bracket has a rear portion 62 and an enlarged front portion 64. The rear portion 62 is provided with a rear surface 66 which is normally cemented to a band 11. Also, the rear portion 68 is provided with an upright retaining channel 68. The edgewise bracket has a front face or surface 70 in which an elongated channel 72 opens for accepting an arch wire 20.

An orthodontic appliance 80 may be utilized in conjunction with the edgewise bracket 60 which is, in many respects, identical to the previously described orthodontic appliance embodiments. Here, the appliance is provided with a transverse lower portion 82 and a pin 84 which extends upwardly therefrom. At each end of the transverse portion 82 there is provided a respective biassing finger 90, 92 which extends upwardly beyond the channel 72 to the sides of the brackets 60. In addition to these elements, which are common with the previously described embodiments, there is here provided retaining fingers 86, 88 which extend upwardly from the transverse portion 82 a distance sufficient to cover the opening of the channel 72.

As can best be seen in FIG. 9, the retaining fingers 86, 88 do not normally behave as biassing fingers when the arch wire 20 is fully contained in the channel 72. However, when the arch wire 20 tends to move out of the channel 72, the retaining fingers 86 apply biassing forces to the arch wire 20 which tend to keep the latter within the channel 72. Insofar as the biassing fingers 90, 92 are concerned, these function similarly as the biassing fingers already described above. Initially, the biassing fingers 90, 92 are disposed on the other side of the arch wire 20 than the pin 84 in their unstressed state. During or subsequent to the mounting of the orthodontic appliance, the biassing fingers 90, 92 are moved to the same side of the arch wire 20 as the pin 84. This generates stresses in the biassing fingers which generate forces which attempt to separate the pin from the biassing fingers. Since the arch wire, for practical purposes, is generally fixed and behaves as a fixed anchoring or reference point, the biassing fingers 90, 92 cannot move. Consequently, forces are applied to the bracket via the pin 84 which tend to move the same rearwardly with relation to the wire 20. More specifically, the pin 84 tends to pivot rearwardly about the lower portion of the pin to which the biassing fingers are attached, as indicated by the arrow 42" in FIG. 9. Such forces tend to cause torqueing or tend to move the roots of a tooth about a pivot axis generally defined by the arch wire 20 while the crown of the tooth is held substantially fixed. It is clear that the orthodontic appliance can also be mounted on the bracket 60 when it is turned 180° in its own plane. In this case, the retaining and the biassing fingers extend downwardly from the top of the bracket and the torqueing takes place in the other sense about the arch wire.

FIG. 10 is a further embodiment of the present invention wherein an elongated lateral biassing finger 96 having a hook 98 at its free end is attached at a free end portion of a pin 30. The lateral biassing finger 96 is integral with the pin 30 and these are advantageously made from a flat metal stamping. In order to increase the resiliency of the lateral biassing finger 96 upwardly and downwardly in the plane of FIG. 10, the lateral finger 96 is twisted at a point 99 intermediate the hook 98 and the pin 30. The lateral biassing finger 96 is shown to be flexed upwardly in such a manner that the hook 98 engages the arch wire 20. The effect of the lateral biassing finger stressed in this manner will be to cause the pin 30 to rotate in a counterclockwise direction as viewed in FIG. 10. This process is commonly known as uprighting of a tooth in which a tipped tooth is returned to its normal inclination without moving the crown. It is clear, that with this, as well as with the other above described embodiments, fingers which have been shown and described as being on one side of the pin in the stressed condition can also be positioned on the other side of the pin in oppositely stressed position to obtain similar but reverse or complementary action.

In connection with all the above described embodiments, the subject invention provides simplicity with which orthodontic attachments may be attached or removed from both edgewise and modified Begg-type brackets or other similar brackets. Each orthodontic appliance is provided with a pin which is removably connected from a channel in a bracket and which has resilient fingers projecting therefrom. In connection with the edgewise bracket, centrally located retaining fingers may be provided which retain an arch wire in the channel of the bracket. With both the different types of brackets, vertical biassing fingers may be provided on one side or on both sides, or a lateral finger may be provided connected to the pin to resiliently abut against the arch wire. In this manner, one can selectively apply forces to a tooth which will cause it to rotate, torque, or become upright respectively. Once corrective action has taken place, the biassing type of orthodontic appliance can be replaced with one which only includes a retaining finger. As described above, however, the retaining fingers are also biassing fingers when an arch wire is not in the channel of an edgewise bracket. Generally, the present invention provides increased versatility with which orthodontic appliances may be removably connected to a bracket to effect a desired result.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. An orthodontic appliance for cooperating with an orthodontic arch wire disposed in an arch wire receiving channel of an orthodontic bracket, comprising mounting means for securely mounting the appliance to the bracket; and resilient elongated finger means mounted in cantilevered relation on said mounting means and extending in a direction substantially normal to the direction of the arch wire in opposed relation to the latter adjacently to the bracket, said finger means being arranged to apply a force to the bracket transverse to the direction of the arch wire when resiliently moved from a normal undeflected position to an operative position, said force having at least a component thereof substantially normal to the axis of the tooth on which the bracket is mounted.

2. An orthodontic appliance as defined in claim 1, wherein the bracket is provided with an elongated retaining channel generally oriented in a direction normal to the direction of the arch wire and having a predetermined length, and wherein said mounting means comprises an elongated pin configured to pass through the retaining channel and having a length greater than said predetermined length, and securing means for securing said elongated pin in said retaining channel.

3. An orthodontic appliance as defined in claim 2, wherein the bracket is an edgewise bracket having a front face and having the arch wire receiving channel in its front face, and wherein said finger means comprises a resilient retaining finger extending to and abutting against at least a portion of the front face of the bracket to be positioned opposite the arch wire receiving channel, whereby said resilient finger prevents the arch wire from leaving the wire receiving channel.

4. An orthodontic appliance as defined in claim 3, wherein said resilient retaining finger has a length sufficient to extend substantially across the entire front face of the bracket and is substantially parallel to said pin.

5. An orthodontic appliance as defined in claim 2, wherein the arch wire has two portions respectively positioned exteriorly of the bracket beyond opposite ends of the arch receiving wire channel, and wherein said finger means comprises a biassing finger arranged to resiliently abut against one of the exterior portions, whereby a force is applied to the arch wire by said biassing finger relative to the bracket.

6. An orthodontic appliance as defined in claim 5, wherein two biassing fingers are provided each respectively arranged to abut against another exterior wire portion on another side of the bracket.

7. An orthodontic appliance as defined in claim 2, wherein said pin and said finger means are constructed from a one-piece flat metal stamping.

8. An orthodontic appliance as defined in claim 5, wherein said biassing finger and said pin are angularly positioned relative to each other and define an angle therebetween, said angle being normally different in an unstressed state of said biassing finger than when said biassing finger abuts against the arch wire in pressure-transmitting relationship.

9. An orthodontic appliance as defined in claim 2, wherein said securing means comprises a deformable free end portion of said pin which is deformed subsequent to passage through said retaining channel.

10. An orthodontic appliance as defined in claim 1, wherein the bracket is provided with an elongated retaining channel generally oriented in a direction normal to the direction of the arch wire, and wherein said mounting means comprises an elongated pin configurated to at least partially pass through the retaining channel and be securely held therein.

11. An orthodontic appliance as defined in claim 3, wherein two resilient retaining fingers are provided each integral and in cantilevered relationship with said pin, said two retaining fingers being substantially parallel to one another and arranged to abut against the front face of the bracket.

12. An orthodontic appliance as defined in claim 3, wherein said bracket has a front surface and side surfaces, the arch wire receiving channel extending between the side surfaces and opening in the front surface, and wherein said finger means comprises a resilient retaining finger arranged to resiliently abut against the front surface of the bracket to cover at least a portion of the arch wire receiving channel.

13. An orthodontic appliance as defined in claim 1, wherein the bracket has an upper open arch wire receiving channel, and wherein said appliance further comprises holding means for retaining the arch wire in said open wire receiving channel.

14. An orthodontic appliance as defined in claim 13, wherein said holding means comprises a pin extending through the bracket a free end portion of which is deformed so as to at least partially close the open channel, whereby the wire is prevented from moving out of the open channel.

15. An orthodontic appliance as defined in claim 13, wherein said holding means comprises a pin extending through the bracket provided with an elongated projection extending substantially transversely of said pin and arranged on the latter so as to at least partially close the open channel when said pin is mounted on said bracket, whereby the wire is prevented from moving out of the open channel.

* * * * *